Oct. 31, 1967  H. FÜEG  3,350,456
PROCESS FOR PREPARING CYCLOHEXANONE FROM CYCLOHEXANOL
Filed Feb. 11, 1964
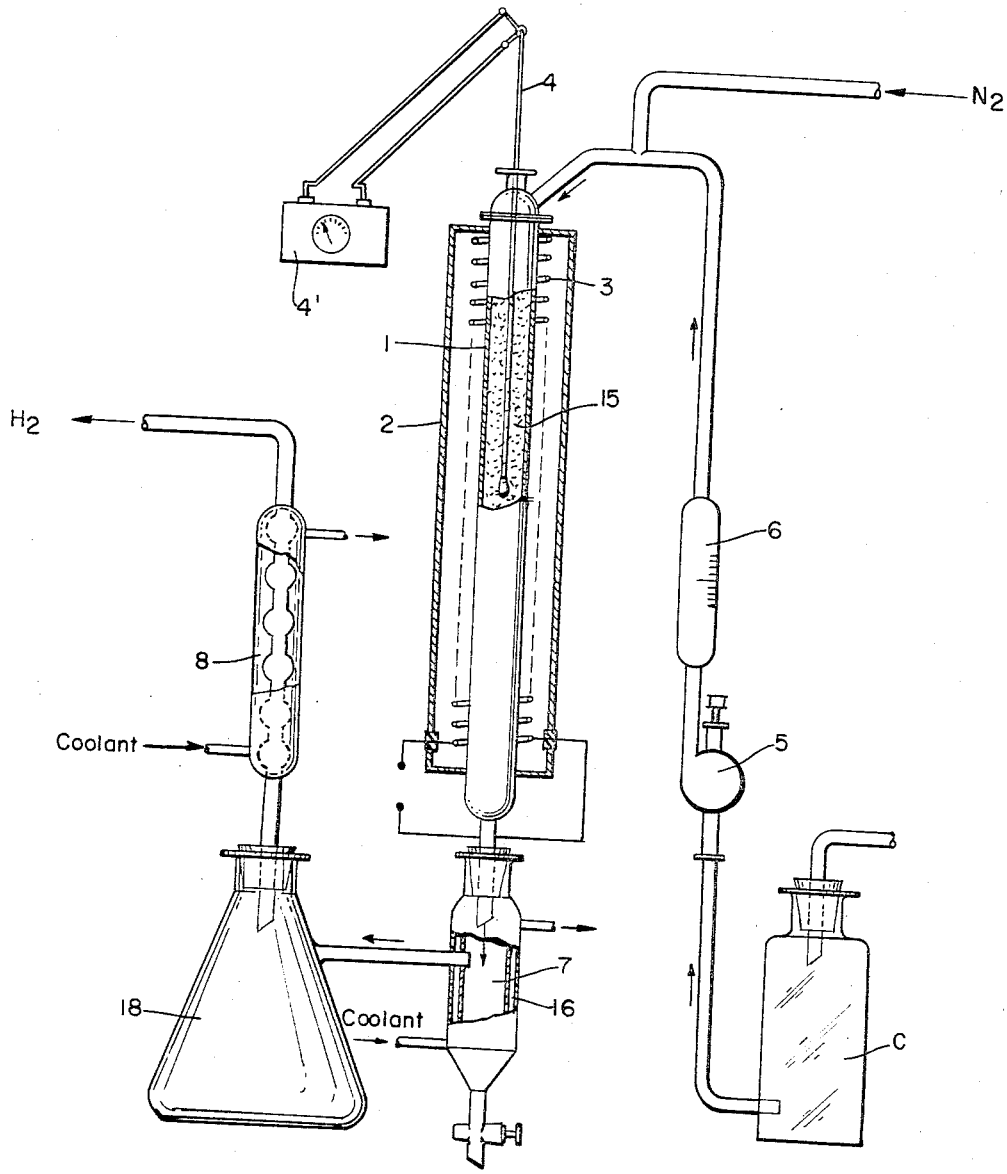
INVENTOR
HEINZ FÜEG

United States Patent Office 3,350,456
Patented Oct. 31, 1967

3,350,456
PROCESS FOR PREPARING CYCLOHEXANONE FROM CYCLOHEXANOL
Heinz Füeg, Chur, Grisons, Switzerland, assignor to Inventa A.G. für Forschung und Patentverwertung, Zurich, Switzerland
Filed Feb. 11, 1964, Ser. No. 344,143
Claims priority, application Switzerland, July 28, 1960, 8,596/60
1 Claim. (Cl. 260—586)

The present invention relates to the preparation of cyclohexanone from cyclohexanol. This is a continuation-in-part of U.S. patent application S.N. 84,648 filed Jan. 24, 1961, now abandoned.

It is known from U.S. Patent 2,338,445 that alicyclic ketones may be prepared from alicyclic alcohols by dehydration in the gaseous phase at temperatures above 500° C., by passing the alcoholic vapors over metallic zinc-copper alloys having a copper content of up to 20% Cu.

This process yields on the whole satisfactory results in the preparation of cyclohexanone from cyclohexanol; upon converting 78% of so-called crude cyclohexanol, which has been obtained by hydrogenation from phenol and which contains 6% of the latter and 0.8–1% water, a mixture is obtained consisting of cyclohexanol and cyclohexanone with 80% of the latter. This conversion and yield may be increased when pure cyclohexanol is taken instead of crude.

It is a drawback of the above described process that the conversion becomes considerably reduced when cyclohexanol is used which has not been derived from phenol by hydrogenation, but from cyclohexane by oxidation with pure oxygen or with oxygen-containing gases at elevated temperature and increased pressure, other oxidation products being obtained as by-products. It is not clear why such a decline in conversion takes place, but it may be assumed that the substances present in cyclohexanol, e.g. formic acid, valeric acid, butyric acid, cyclohexyl valerate, acetic acid and others, are the reason therefor.

It has now been discovered that when starting from cyclohexanol which is obtained from cyclohexane by oxidation with oxygen or oxygen-containing gases, and which is accompanied by the above-mentioned other oxidation products, satisfactory yields of cyclohexanone may be obtained, when a catalyst is used which consists of zinc oxide and zinc carbonate or a mixture of zinc oxide and carbonate with alkaline earth oxides and carbonates. As alkaline earth oxides we prefer to use calcium oxide or magnesium oxide. An addition of graphite may be made to the catalyst which acts as a lubricant and enhances shaping.

Cyclohexanol which is obtained by the above-mentioned method by oxidation from cyclohexane contains a small amount of organic acids which cannot be removed by distillation. When such cyclohexanol is dehydrogenated by the above-described known process, the conversion decreases to about 50–20%. When, however, dehydrogenation is carried out by the process according to the invention, the conversion amounts to about 80% as is the case of dehydrogenation of cyclohexanol obtained from phenol, and the yield is about 90–96%.

In order further to test the activity of the catalyst according to the invention, pure cyclohexanol obtained from phenol was mixed with the acids occurring when cyclohexane is oxidized. In this operation it was found that an addition of formic acid, valeric acid, butyric acid, cyclohexyl valerate, and acetic acid, when present in an amount of about 3% by weight, do not substantially decrease the effectiveness of the catalyst, whereas the effectiveness of a zinc catalyst is, under similar conditions, reduced to about 50% of its original effectiveness, or to even less.

At the same time, it was observed that it is advantageous when in the cyclohexanol to be dehydrogenated, valeric acid and butyric acid together do not amount to more than about 2% by weight.

The ratio of zinc oxide and carbonate with respect to the alkaline earth oxides and carbonates may be chosen practically as desired.

Previous suggestions were to influence the dehydrating or dehydrogenating character of oxide catalysts by the addition of small amounts of alkali metal and alkaline earth metals in form of their oxides, carbonates or salts with weak acids. (U.S. Patent 1,895,528.) The patent relates to dehydrating as well as dehydrogenating processes, thus the preparation of propylene from iso-propanol, and ethylene from ethanol. The present invention is only concerned with the preparation of cyclo-hexanone from a special cyclohexanol which contains certain specified impurities due to whose presence the known methods fail to achieve such yields which will make the process economically rewarding.

It is also known to use as catalysts zinc oxide alone or in combination with bismuth oxide in the dehydrogenation of secondary alcohols in gaseous phase; zinc oxide and bismuth oxide on bronze spirals or on coke, as carrier; oxides of the 2nd group of the Periodic Table on zinc oxide. U.S. Patent 2,549,844 mentions zinc oxide, magnesium oxide and beryllium oxide. However, the invention does not relate, as did all previous processes, to the dehydrogenation of cyclohexanol, but to the dehydrogenation of such cyclohexanol which is contaminated by organic acids and esters. Furthermore, the process according to the invention uses the oxides in combination with carbonates.

It is an object of the present invention to provide a process of preparing cyclohexanone from cyclohexanol which is in an impure state, and which will, nevertheless, yield a satisfactory amount of cyclohexanone.

It is another object of the present invention to provide a catalyst for carrying out the preparation of cyclohexanone from impure cyclohexanol in very satisfactory manner.

Other objects and adavntages of the present invention will become apparent from the detailed description hereinbelow.

Preparation of the catalysts

In the following, a description will be given of the preparation of the catalysts to be used in the examples, which proceed according to the invention. All percentages are by weight.

(1) Preparation of a mixed catalyst containing $ZnO+ZnCO_3+CaO+CaCO_3$. This may be done by mixing together, with constant stirring, in sodium carbonate solution a solution of $Zn(NO_3)_2 \cdot 6H_2O$ and a solution of $Ca(NO_3)_2 \cdot 4H_2O$ in a molar ratio of 1:1. (The sodium carbonate solution is in excess.) The gel-like precipitate of $ZnCO_3$ and $CaCO_3$ is washed free of nitrate with distilled water and is filtered. The precipitate, which is then almost dry, is made into a paste, e.g. on a kneading machine. The paste is stored for some time and slowly dried. To the dry powder, a small amount of graphite is added, for instance 0.5–1.0% and the mass is then tableted. The tablets may have a diameter of 10 mm. and a height of 5 mm. Bulk weight 0.96.

The freshly prepared catalyst contains: $CO_2$, 27.92%; Zn, 29.85%; Ca, 18.46.

The $CaCO_3$ present contains $6H_2O$ bound as crystal water. As the catalyst is used in the process, it gradually loses part of its $CO_2$ and the carbonates of Zn and Ca are converted into oxides. At the prevailing high temperatures between about 400 and 450° C., the $CO_2$ content decreases after several days to 22.4% and remains fairly constant at that value. After one year in use the catalyst was found to have the following composition: $CO_2$, 22.46%; Zn, 32.91%; Ca, 19.70%; which corresponds to a ratio of ZnO:ZnCO=1:0.386 and $$CaO:CaCO_3=1:79.5$$

(2) Preparation of a catalyst containing $ZnO+ZnCO_3$. In a manner similar to the one described under 1 above, a solution of $Zn(NO_3)_2 \cdot 6H_2O$ is introduced while stirring into a sodium carbonate solution, whereby a gel-like precipitate of $ZnCO_3$ is obtained. Washing, paste formation, drying and further processing is carried out in the manner described.

The freshly prepared catalyst contains $CO_2$, 35.2%; Zn, 49.7%.

During the use of the catalyst at temperatures between 400 and 450° C., the $CO_2$ content gradually decreases so that a mixture of ZnO and $ZnCO_3$ will be present in the catalyst during the reaction in about the following ratio: $CO_2$, 3.3%; Zn, 79.6%.

(3) Preparation of $MgO+MgCO_3$ in combination with $ZnO+ZnCO_3$. The preparation is analogous to the one described under 1 for $ZnO+ZnCO_3$ with $CaO+CaCO_3$.

Obtained is a catalyst of the original composition: $CO_2$, 41.0%; Zn, 30.5%; Mg, 11.4% which gradually becomes the following composition: $CO_2$, 2.11%; Zn, 53.1%; Mg, 19.5%.

In the following, the invention is described in a number of examples which are given by way of illustration, but not of limitation. In the examples, the results of dehydrogenation carried out by means of the novel catalyst are compared with those obtained by a known zinc catalyst used in the dehydrogenation of cyclohexanol made from phenol.

The process is carried out in an apparatus which is schematically illustrated in the drawing annexed hereto.

In the drawing, a copper tube 1 having a diameter of 30 mm. is shown surrounded by a jacket 2 of a furnace provided with heating wire coils 3 arranged along the entire length of tube 1 and capable of being supplied with up to 3000 watts. For measuring the temperature in the tube, a thermo element 4 extending into the tube is provided, whose dial for reading the temperaturre is shown at 4[1]. Liquid cyclohexanol for dehydrogenation is introduced from a container C by means of a glass centrifugal pump 5 and via a rotameter 6 into the tube 1 where the catalyst is illustrated by 15. The cyclohexanone formed in the reaction is collected in a vessel 7 surrounded by a cooling jacket 16. Hydrogen escapes from the vessel 7 and is passed through a reflux condenser 8 while entrained cyclohexanone collects in a flask 18. The effective contact space is 500 cc.

Example 1.—*Dehydrogenation of cyclohexanol made by hydrogenation of phenol in the presence of a known zinc catalyst*

The catalyst used in this example consists of coils rolled of iron band of 1 cm. width which were zinc-coated by a special flame method. The catalyst is filled into a chamber or tube as described above. Before starting the dehydrogenation, I heat the catalyst under nitrogen to a desired temperature of 425–435° C. The cyclohexanol, obtained from phenol by hydrogenation over a nickel catalyst is fed into the contact chamber at a temperature of about 30° C. by means of the pump 5 and past the rotameter 6. The cyclohexanone formed in the reaction is drained continuously and passed to analysis.

TABLE I.—TESTS

| Product | Charge | Temp., °C. | Conversion, percent | Analysis of Crude Anone | | |
|---|---|---|---|---|---|---|
| | | | | $H_2O$, percent | Phenol, percent | Anone, percent |
| Pure Anol from plant | 0.5 | 425 | 83 | 0.2 | | 83 |
| Crude Anol | 0.5 | 430 | 78 | 1.0 | 6.5 | 80 |

Analysis of starting product:
(a) Pure Anol—$H_2O$, 0.1%; Phenol, 0%; M.P., 23° C.
(b) Crude Anol—$H_2O$, 0.8–1%; Phenol, 6%; M.P., 20° C.

In the dehydrogenation over zinc coils of crude cyclohexanol, by-products formed include water about 0.5%, phenol ab. 0.5 to 1%, and hexane (by dehydration).

The anone formed contains the by-products of the starting product, which may, however, be eliminated by distillation.

Yields in cyclohexanone: 98—98.5% for pure cyclohexanol; 94–96% for crude cyclohexanol.

Example 2.—*Dehydrogenation of cyclohexanol made by hydrogenation of phenol, in the presence of a catalyst containing $ZnO+ZnCO_3+CaO+CaCO_3$*

Pure cyclohexanol and crude cyclohexanol were dehydrogenated as indicated in Example 1 with the catalyst, according to the invention. Before starting the dehydrogenation, heating up was done under $N_2$ whereby in this case, $H_2O$ was formed, the amount depending on the drying of the pills.

After pill formation, the catalyst still contains a certain amount of moisture (2.5–3%). At a dehydrogenation temperature of 425–435° C. the cyclohexanol is brought into contact with the catalyst in the same way as in Example 1. The dehydrogenation occurs in the same way, the quantities converted being somewhat higher.

TABLE II.—TESTS

| Product | Charge | Temp., °C. | Conversion, percent | Analysis of Crude Anone | | |
|---|---|---|---|---|---|---|
| | | | | $H_2O$, percent | Phenol, percent | Anone, percent |
| Pure Anol | 0.5 | 423 | 87 | 0.66 | | 86–88 |
| Crude Anol | 0.5 | 429 | 88 | 1.1 | 4 | 88–89 |

Example 3.—*Dehydrogenation of cyclohexanol made by distillation of the oxidation mixture of cyclohexane in the presence of a known zinc catalyst*

A product consisting of a mixture of cyclohexanol and cyclohexanone derived from a liquid phase air oxidation of cyclohexane at temperatures of 140–170° C. and of pressures of 11 to 26 kg./cm.[2], was distilled in the laboratory in a column filled with Raschig bodies and was then dehydrogenated over a catalyst consisting of Zn spirals. For dehydrogenation we used the cyclohexanol fraction, which had the following composition:

| | percent |
|---|---|
| Cyclohexanol | 97 |
| Cyclohexylformate | 1 |
| Cyclohexylacetate | 1.5 |
| Cyclohexylpropionate+butyrate+valerate | 0.5 |

M.P.=21.6° C., temp.=80.5° C. at 28 mm. Hg.

Operating conditions were as described in the cyclohexanol tests from the phenolhydrogenation.

TABLE III.—TESTS

| | Charge | Temp., °C. | Conversion, percent | H$_2$O, percent | Anone, percent |
|---|---|---|---|---|---|
| Cyclohexane-Anol | 0.5 | 435 | 20–21 | 0.67 | 18–19 |
| Crude Cyclohexane-Anol | 0.5 | 435–438 | 47–53 | 0.80 | 48 |

*Example 4.—Dehydrogenation of cyclohexanol fraction derived by distillation of a mixture resulting from the oxidation of cyclohexane with a catalyst as described under 1, consisting of ZnO+ZnCO$_3$ and CaO+CaCO$_3$*

The cyclohexanol fraction of a mixture resulting from the oxidation as described under 3 was used. The catalyst, however, was in accordance with the invention.

TABLE IV

| | Charge | Temp., °C. | Conversion, percent | H$_2$O, percent | Anone, percent |
|---|---|---|---|---|---|
| Cyclohexane-Anol | 0.5 | 436 | 80–82 | | 86.1 |
| Do | 0.5 | 429 | 78–80 | | 83.5 |

*Example 5.—Dehydrogenation of cyclohexanol fraction as in Example 4, using catalyst consisting of ZnO and ZnCO$_3$*

The cyclohexanol fraction was the same as in Examples 3 and 4, the catalyst was made as described under 2.

TABLE V

| | Charge | Temp., °C. | Conversion, percent | H$_2$O, percent | Anone, percent |
|---|---|---|---|---|---|
| Cyclohexanol | 0.5 | 436 | 77–80 | | 85.1 |
| Do | 0.5 | 429 | 75–76 | | 82.9 |

*Example 6.—Dehydrogenation of cyclohexanol fraction as in Example 4, using catalyst consisting of ZnO +ZnCO$_3$+MgO+MgCO$_3$*

The cyclohexanol fraction was the same as in Examples 3 and 4, the catalyst was made as described under 3.

TABLE VI

| | Charge | Temp., °C. | Conversion, percent | H$_2$O, percent | Anone, percent |
|---|---|---|---|---|---|
| Cyclohexanol | 0.5 | 430 | 88.2 | 0.5 | 94 |
| Do | 0.5 | 430 | 87.3 | 0.5 | 95.5 |

What is claimed is:

In the process of preparing cyclohexanone from cyclohexanol containing impurities which consist of formic acid, valeric acid, butyric acid, and acetic acid, and of their cyclohexyl esters in a total amount of up to 5% by weight, which impurities are formed in the preparation of cyclohexanol from cyclohexane by oxidation with oxygen-containing gas, the step which comprises converting said cyclohexanol by dehydrogenation into cyclohexanone at temperatures ranging from 400–450° C. in the presence of a catalyst consisting of zinc oxide plus zinc carbonate plus calcium oxide plus calcium carbonate.

References Cited

UNITED STATES PATENTS

| 1,892,011 | 12/1932 | Sandkuhl | 260—586 |
| 1,895,528 | 1/1933 | Taylor | 260—596 |
| 2,083,877 | 6/1937 | Steck | 260—586 |
| 2,549,844 | 4/1951 | Mottern | 260—586 |
| 3,149,166 | 9/1964 | Poehler et al. | 260—586 |

DANIEL D. HORWITZ, *Primary Examiner.*

W. B. LONE, *Assistant Examiner.*